US012083917B2

(12) United States Patent
Mori et al.

(10) Patent No.: US 12,083,917 B2
(45) Date of Patent: Sep. 10, 2024

(54) CONTROL DEVICE, STORAGE MEDIUM, AND ELECTRIC POWER MANAGEMENT SYSTEM

(71) Applicant: TOYOTA JIDOSHA KABUSHIKI KAISHA, Toyota (JP)

(72) Inventors: Junichi Mori, Nagakute (JP); Kentaro Ban, Susono (JP); Tatsuro Kiyohara, Hiratsuka (JP); Yuta Maniwa, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 17/808,220

(22) Filed: Jun. 22, 2022

(65) Prior Publication Data

US 2023/0055841 A1 Feb. 23, 2023

(30) Foreign Application Priority Data

Aug. 17, 2021 (JP) ................................ 2021-132847

(51) Int. Cl.

*B60L 53/62* (2019.01)
*B60L 53/66* (2019.01)
*B60L 58/12* (2019.01)
*G06Q 10/0631* (2023.01)
*G06Q 30/0601* (2023.01)
*G06Q 50/06* (2012.01)
*H02J 7/02* (2016.01)

(52) U.S. Cl.

CPC ............ *B60L 53/62* (2019.02); *B60L 53/665* (2019.02); *B60L 58/12* (2019.02); *G06Q 10/06315* (2013.01); *G06Q 30/0631* (2013.01); *G06Q 50/06* (2013.01)

(58) Field of Classification Search

CPC ........ B60L 53/62; B60L 53/665; B60L 58/12; B60L 11/18; H02J 10/06316; H02J 30/0631; H02J 50/06; H02J 7/02; H02J 7/10

See application file for complete search history.

(56) References Cited

U.S. PATENT DOCUMENTS

2013/0335032 A1* 12/2013 Kuribayashi ........... B60L 55/00 320/137
2016/0129802 A1* 5/2016 Yoon .................... G06Q 20/145 705/412
2016/0159239 A1* 6/2016 Shi .......................... B60L 53/14 320/134
2019/0217716 A1* 7/2019 Yang ....................... B60L 53/66
2020/0231059 A1* 7/2020 Hishida ................... B60L 50/66
2020/0353831 A1* 11/2020 Corey ................ G06Q 30/0208
2020/0384878 A1* 12/2020 Pontefract ............... B60L 53/66
2024/0001795 A1* 1/2024 Sakata .................. G16Y 10/40

FOREIGN PATENT DOCUMENTS

JP 2015019465 A 1/2015

* cited by examiner

*Primary Examiner* — Tan Q Nguyen
(74) *Attorney, Agent, or Firm* — Dickinson Wright, PLLC

(57) ABSTRACT

A control device includes a processor that calculates a total charge demand based on SOC information and a charge request signal of each of a plurality of electrified vehicles and performs an operation for creating, based on the calculated total charge demand, an electric power supply and demand operation plan that manages electric power for charging the electrified vehicles by a charging facility.

14 Claims, 5 Drawing Sheets

START
ACQUIRE SOC INFORMATION AND CHARGE REQUEST SIGNAL OF ELECTRIFIED VEHICLE — S11
CHARGE REQUEST SIGNAL IS ON? — S12
YES / NO
CALCULATE CHARGE PROBABILITY AS 1 — S13
CALCULATE CHARGE PROBABILITY FROM CHARGE PROBABILITY MAP — S14
CALCULATE EXPECTED CHARGING VALUE — S15
CALCULATE TOTAL DEMAND FOR ELECTRIC CHARGING POWER BY INTEGRATING EXPECTED CHARGING VALUES OF RESPECTIVE ELECTRIFIED VEHICLES IN MANAGEMENT AREA — S16
CREATE ELECTRIC POWER SUPPLY AND DEMAND OPERATION PLAN — S17
END

CONTROL DEVICE, STORAGE MEDIUM, AND ELECTRIC POWER MANAGEMENT SYSTEM

CROSS-REFERENCE TO RELATED APPLICATION

This application claims priority to Japanese Patent Application No. 2021-132847 filed on Aug. 17, 2021, incorporated herein by reference in its entirety.

BACKGROUND

1. Technical Field

The present disclosure relates to a control device, a storage medium, and an electric power management system.

2. Description of Related Art

Japanese Unexamined Patent Application Publication No. 2015-019465 discloses a technique for controlling on/off of a charger according to a charging plan including allocation of a charger used by an electrified vehicle, a charging start time, and a required charging amount.

SUMMARY

When charging demands of a plurality of electrified vehicles are large, an electric power supply and demand operation plan that manages electric power for charging electrified vehicles by charging facilities may fail.

The present disclosure provides a control device, a storage medium, and an electric power management system capable of preventing the electric power supply and demand operation plan from failing.

A control device according to a first aspect of the present disclosure includes a processor configured to calculate a total charge demand based on state-of-charge (SOC) information and a charge request signal of each of a plurality of electrified vehicles and perform an operation for creating, based on the calculated total charge demand, an electric power supply and demand operation plan that manages electric power for charging the electrified vehicles by a charging facility.

A storage medium according to a second aspect of the present disclosure stores a program that causes a processor to calculate a total charge demand based on SOC information and a charge request signal of each of a plurality of electrified vehicles and perform an operation for creating, based on the calculated total charge demand, an electric power supply and demand operation plan that manages electric power for charging the electrified vehicles by a charging facility.

An electric power management system according to a third aspect of the present disclosure includes an electrified vehicle including a first processor configured to output SOC information and a charge request signal, and a control device including a second processor configured to calculate a total charge demand based on the SOC information and the charge request signal of each of a plurality of electrified vehicles and perform an operation for creating, based on the calculated total charge demand, an electric power supply and demand operation plan that manages electric power for charging the electrified vehicles by a charging facility.

Each aspect of the present disclosure has the effect of preventing the electric power supply and demand operation plan from the failure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a control device, a storage medium, and an electric power management system according to the present disclosure will be described. The present disclosure is not limited to the present embodiment.

Figure 1:
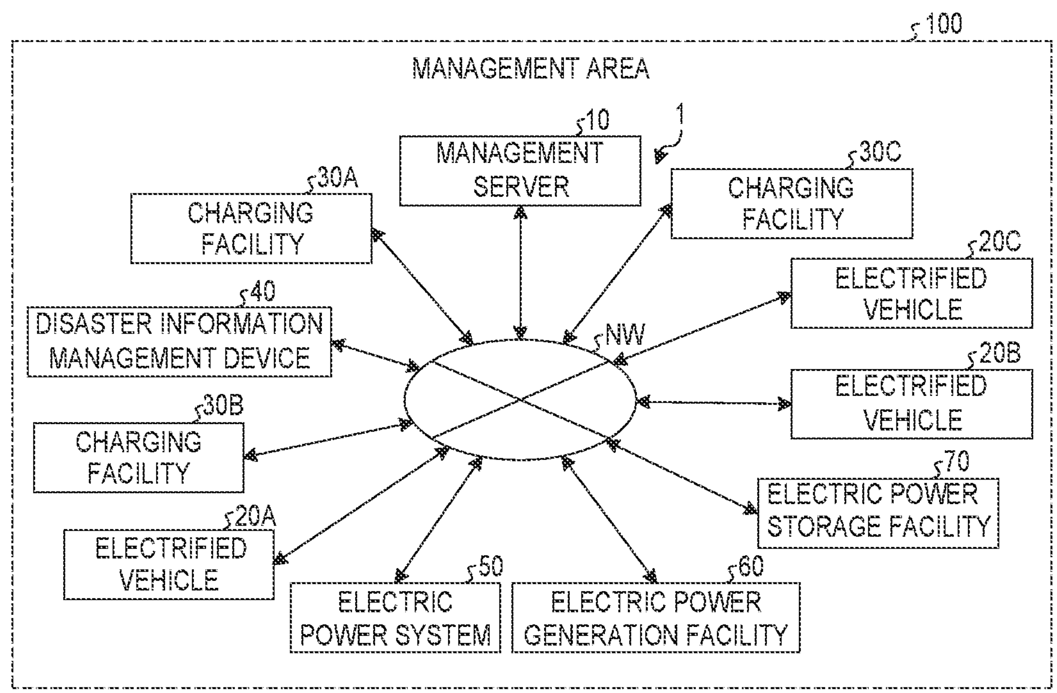
FIG. 1 is a diagram illustrating a schematic configuration of an electric power management system according to an embodiment.

FIG. 1 is a diagram illustrating a schematic configuration of an electric power management system 1 according to the embodiment. The electric power management system 1 is composed of a management server 10, a plurality of electrified vehicles 20A, 20B, 20C, a plurality of charging facilities 30A, 30B, 30C, a disaster information management device 40, a network NW, and the like provided in a management area 100.

In the following description, when the electrified vehicles 20A, 20B, 20C are not particularly distinguished, they are simply referred to as the electrified vehicles 20. Further, when the charging facilities 30A, 30B, 30C are not particularly distinguished, they are simply referred to as the charging facilities 30. Further, in FIG. 1, for convenience of explanation, only three electrified vehicles 20A, 20B, 20C and three charging facilities 30A, 30B, 30C are shown. However, the number of the electrified vehicles 20 in the management area 100 and the number of the charging facilities 30 provided in the management area are not particularly limited.

The electric power management system 1 manages the supply of electric power from the charging facilities 30A, 30B, 30C to the electrified vehicles 20A, 20B, 20C by the management server 10, for example, based on an electric power supply and demand operation plan that manages electric power for charging the electrified vehicles 20A, 20B, 20C by the charging facilities 30A, 30B, 30C.

The management server 10, the electrified vehicles 20A, 20B, 20C, the charging facilities 30A, 30B, 30C, and the disaster information management device 40 are configured to be able to communicate with each other via the network NW.

Figure 2:
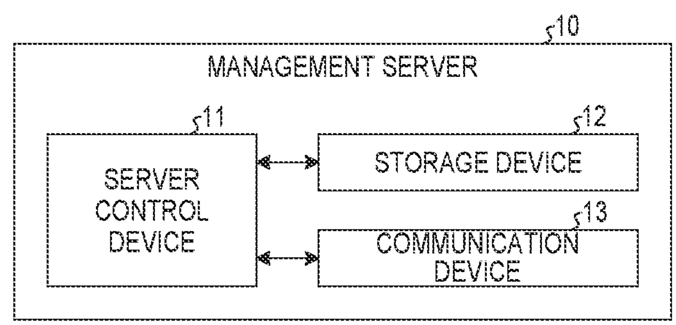
FIG. 2 is a diagram illustrating a schematic configuration of a management server.

FIG. 2 is a diagram illustrating a schematic configuration of the management server 10. The management server 10 includes a server control device 11, a storage device 12, a communication device 13, and the like.

The server control device 11 includes a processor including a central processing unit (CPU), a digital signal processor (DSP), a field-programmable gate array (FPGA), and the like, and a memory including a random access memory (RAM), a read only memory (ROM), and the like. The server control device 11 loads a program stored in the storage device 12 into a work area of a memory and executes it, and controls each component or the like through the execution of the program so as to realize a function that meets a predetermined purpose.

The storage device 12 is composed of a recording medium (storage medium) such as an erasable programmable ROM (EPROM), a hard disk drive (HDD), and a removable medium, and the like. Examples of the removable medium include a recording medium such as optical discs (compact disc (CD)-R or CD-ROM, digital versatile disc (DVD)-R or DVD-ROM, Blu-ray (registered trademark) disc (BD), and the like) and flash memories (universal serial bus (USB) memory, memory card, and the like). The storage device 12 can store an operating system (OS), various programs, various tables, various databases, and the like. The storage device 12 stores, for example, an electric power supply and demand operation plan for managing electric power for charging the electrified vehicles 20 by the charging facilities 30 in the management area 100. In addition, the storage device 12 stores electrified vehicle IDs, which are unique information for identifying each of the electrified vehicles 20A, 20B, 20C, and charging facility IDs, which are unique information for identifying each of the charging facilities 30A, 30B, 30C.

The communication device 13 is composed of, for example, a local area network (LAN) interface board, a wireless communication circuit for wireless communication, and the like. The communication device 13 is connected to the network NW such as the Internet, which is a public communication network. Then, the communication device 13 realizes bidirectional communication between the server control device 11 and the network NW by connecting to the network NW.

Figure 3:
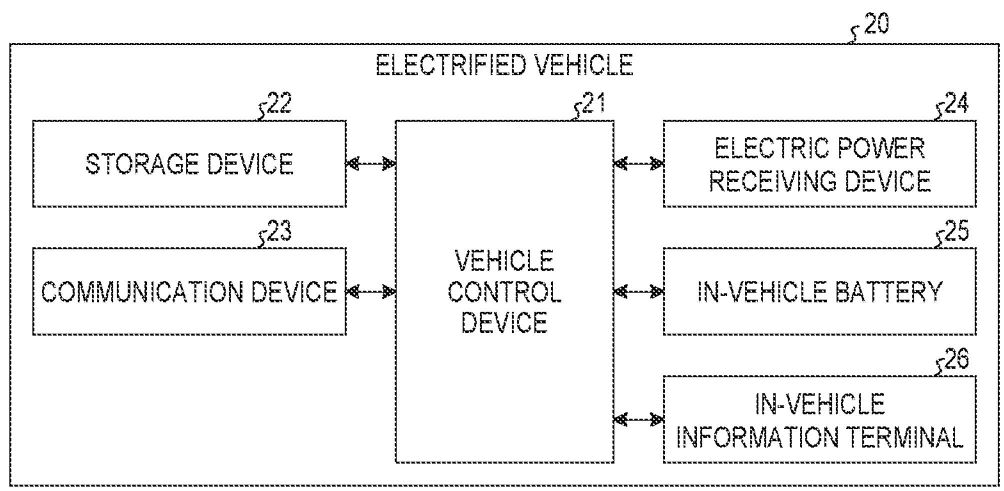
FIG. 3 is a diagram illustrating a schematic configuration of an electrified vehicle.

FIG. 3 is a diagram illustrating a schematic configuration of the electrified vehicle 20. The electrified vehicle 20 includes a vehicle control device 21, a storage device 22, a communication device 23, an electric power receiving device 24, an in-vehicle battery 25, and the like. The physical configuration of the vehicle control device 21, the storage device 22, and the communication device 23 is the same as, for example, that of the server control device 11, the storage device 12, and the communication device 13 included in the management server 10.

The electric power receiving device 24 receives electric power from the charging facility 30 and supplies the electric power to the in-vehicle battery 25. As the electric power receiving method of the electric power receiving device 24, for example, at least one known electric power receiving method of contact-type electric power receiving and non-contact-type electric power receiving can be adopted.

The in-vehicle battery 25 is composed of a secondary battery such as a nickel hydrogen battery or a lithium ion battery. The in-vehicle battery 25 is charged by the electric power supplied from the charging facility 30 via the electric power receiving device 24, or supplies electric power to a drive device including a motor or an inverter of the electrified vehicle 20. As the in-vehicle battery 25, a capacitor such as an electric double layer capacitor can also be adopted.

Figure 4:
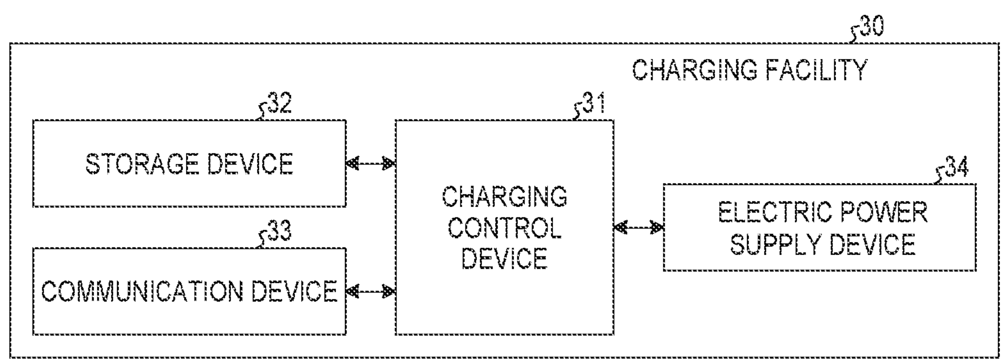
FIG. 4 is a diagram illustrating a schematic configuration of a charging facility.

FIG. 4 is a diagram illustrating a schematic configuration of the charging facility 30. The charging facility 30 includes a charging control device 31, a storage device 32, a communication device 33, an electric power supply device 34, and the like. The physical configuration of the charge control device 31, the storage device 32, and the communication device 33 is the same as, for example, that of the server control device 11, the storage device 12, and the communication device 13 included in the management server 10.

The electric power supply device 34 is connected to a commercial electric power source such as an electric power system 50, and supplies electric power to the electric power receiving device 24 provided in the electrified vehicle 20. As the electric power supply method of the electric power supply device 34, for example, at least one known electric power supply method of contact-type electric power supply and non-contact-type electric power supply can be adopted.

Figure 5:
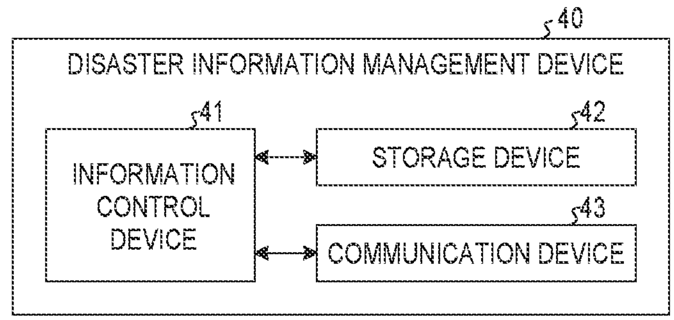
FIG. 5 is a diagram illustrating a schematic configuration of a disaster information management device.

FIG. 5 is a diagram illustrating a schematic configuration of the disaster information management device 40. The disaster information management device 40 includes an information control device 41, a storage device 42, a communication device 43, and the like. The physical configuration of the information control device 41, the storage device 42, and the communication device 43 is the same as, for example, that of the server control device 11, the storage device 12, and the communication device 13 included in the management server 10.

The disaster information management device 40 is, for example, a device that outputs disaster information on the management area 100 to the management server 10 via the network NW. The information control device 41 acquires information (hereafter, also referred to as disaster information) on disasters such as heavy rains, floods, typhoons, and earthquakes from public or private organizations that send weather forecasts, disaster prevention centers of national and local governments, and the like, and stores the information in the storage device 42. Then, the information control device 41 outputs the disaster information stored in the storage device 42 to the management server 10 by the communication device 43. The disaster information also includes the predicted time of occurrence of a disaster predicted to occur in the future.

Returning to FIG. 1, the electric power system 50 is, for example, an electric power grid composed of an electric power plant and an electric power transmission/distribution facility provided by an electric power company or the like.

An electric power generation facility 60 is composed of, for example, a fuel cell that generates electric power by using hydrogen supplied from a hydrogen supply source. The electric power generation facility 60 may be configured to operate an internal combustion engine using a liquid fuel such as petroleum fuel or alcohol so as to generate electric power by a rotary electric machine. The electric power generated by the electric power generation facility 60 is supplied to the charging facility 30, an electric power storage facility 70, or the like via an electric power cable or the like.

The electric power storage equipment 70 includes a secondary battery such as a lithium ion battery or a nickel hydrogen battery. A capacitor such as an electric double layer capacitor can also be used for the electric power storage facility 70. The electric power storage facility 70 can store electric power supplied from the electric power system 50 or the electric power generation facility 60, or discharge the electric power to the charging facility 30.

Here, when the electrified vehicles 20 charge the in-vehicle batteries 25 at the charging facilities 30 scattered in the management area 100, depending on the usage status of each of the charging facilities 30, it may be necessary to search for an available charging facility 30. Further, when the total charge demand by the electrified vehicles 20 is large in the management area 100, the charging plan may fail.

Therefore, in the electric power management system 1 according to the embodiment, the server control device 11 of the management server 10 calculates the expected value of the electric charging power of each of the electrified vehicles 20 based on the state of charge (SOC) information which is the information of the remaining amount of each of the in-vehicle batteries 25 of the electrified vehicles 20 and a charge request signal, and then the server control device 11 calculates the total charge demand by integrating the calculated expected values for the electrified vehicles 20 in the management area 100. Then, the management server 10 creates an electric power supply and demand operation plan based on the calculated total charge demand. In this case, the server control device 11 creates the electric power supply and demand operation plan so as to reflect the total charge demand in the electric power generation plan related to the electric power generation facility 60, the electric power storage plan related to the electric power storage facility 70, or the electric power purchase plan from the electric power system 50.

Figure 6:
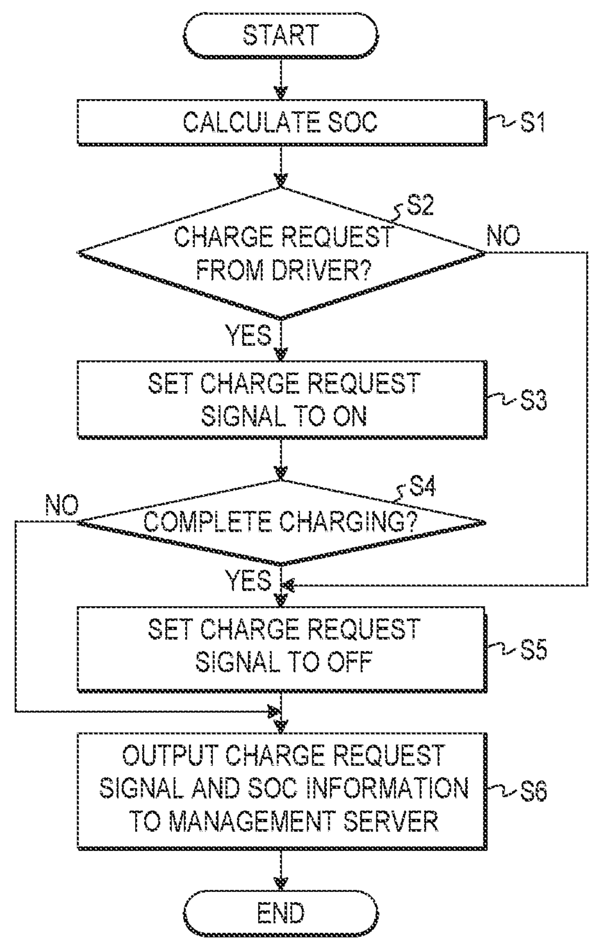
FIG. 6 is a diagram illustrating a control routine performed by a vehicle control device of the electrified vehicle.

FIG. 6 is a diagram illustrating a control routine executed by the vehicle control device 21 of the electrified vehicle 20. This control routine is executed, for example, in a cycle of one second.

First, the vehicle control device 21 calculates the SOC of the in-vehicle battery 25 in step S1. Next, the vehicle control device 21 determines in step S2 whether there is a charge request from a driver. When the vehicle control device 21 determines that there is a charge request from the driver (Yes in step S2), the vehicle control device 21 sets the charge request signal to ON in step S3. Next, the vehicle control device 21 determines in step S4 whether the charging of the in-vehicle battery 25 is executed at the charging facility 30 and the charging of the in-vehicle battery 25 is completed. When the vehicle control device 21 determines that the charging of the in-vehicle battery 25 is completed (Yes in step S4), the vehicle control device 21 sets the charge request signal to OFF in step S5. Next, in step S6, the vehicle control device 21 outputs the SOC information signal and the charge request signal (OFF) to the management server 10 via the network NW or the like by the communication device 23. Then, the vehicle control device 21 ends the control routine.

Further, in step S4, when it is determined that the charging facility 30 has not charged the in-vehicle battery 25 and the charging of the in-vehicle battery 25 has not been completed (No in step S4), in step S6, the vehicle control device 21 outputs the SOC information signal and the charge request signal (ON) to the management server 10 via the network NW or the like by the communication device 23. Then, the vehicle control device 21 ends the control routine.

When it is determined in step S2 that there is no charge request from the driver (No in step S2), the charge request signal is set to OFF in step S5. Next, in step S6, the vehicle control device 21 outputs the SOC information signal and the charge request signal (OFF) to the management server 10 via the network NW or the like by the communication device 23. Then, the vehicle control device 21 ends the control routine.

Figure 7:
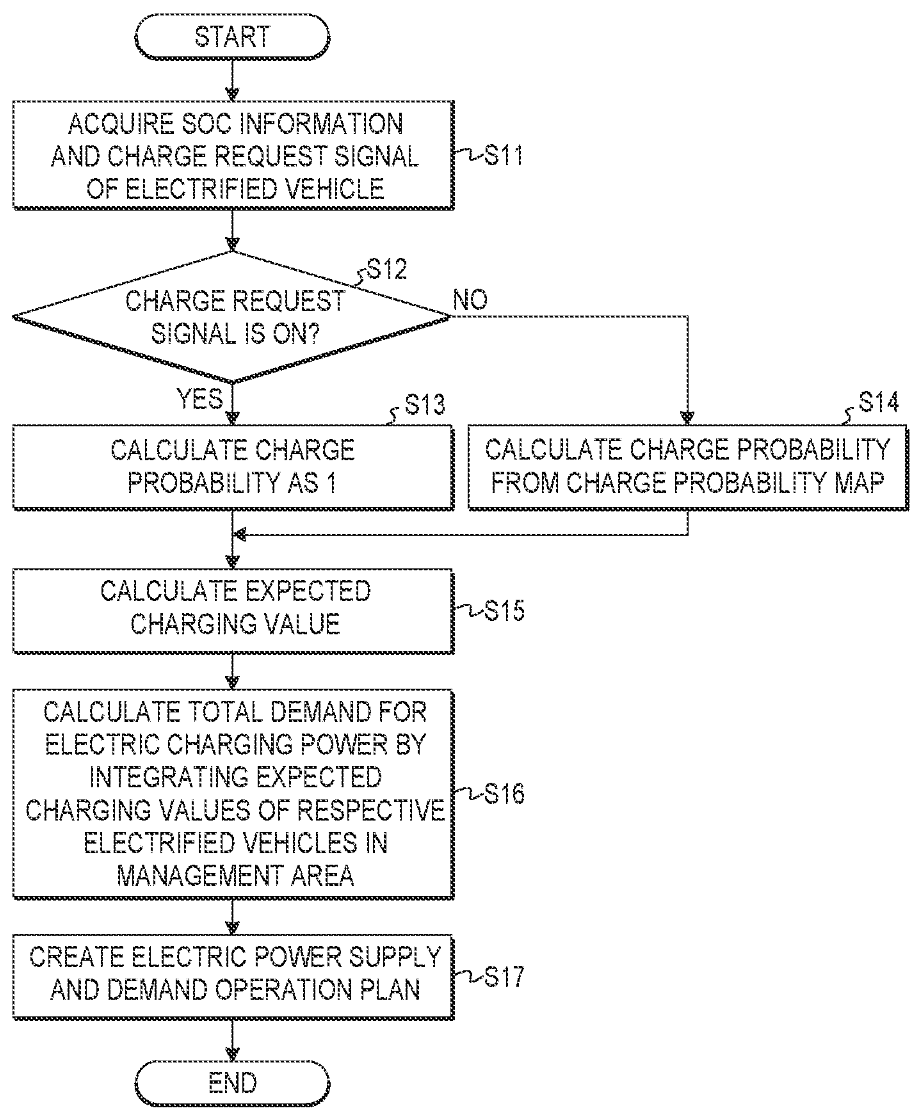
FIG. 7 is a diagram illustrating a calculation control routine of an electric power supply and demand operation plan executed by a server control device of a management server.

FIG. 7 is a diagram illustrating a calculation control routine of the electric power supply and demand operation plan executed by the server control device 11 of the management server 10.

First, the server control device 11 acquires the SOC information and the charge request signal of the electrified vehicle 20 in step S11. Next, the server control device 11 determines in step S12 whether the charge request signal is set to ON. When the server control device 11 determines that the charge request signal is set to ON (Yes in step S12), the server control device 11 calculates the charge probability as 1 in step S13. Then, the server control device 11 proceeds to step S15. On the other hand, when the server control device 11 determines that the charge request signal is not set to ON (No in step S12), in step S14, the charge probability is calculated based on a charge probability map showing the relationship between the SOC and the charge probability, which is stored in the storage device 12 of the management server 10 and in which the charge probability is determined depending on the SOC of the electrified vehicle 20. Then, the server control device 11 proceeds to step S15.

Next, in step S15, the server control device 11 calculates an expected charging value, which is an expected value indicating how much charging electric power the electrified vehicle 20 needs to charge the in-vehicle battery 25. The expected charging value can be calculated, for example, by the formula of expected charging value=(100 [%]−SOC [%])/100×charge probability×charge capacity [kWh] of in-vehicle battery). Next, in step S16, the server control device 11 integrates the expected charging values of the respective electrified vehicles 20 in the management area 100 to calculate the total demand (total charge demand) for electric charging power. Next, in step S17, based on the calculated total demand (total charge demand) for electric charging power, the server control device 11 performs an operation to create an electric power supply and demand operation plan such that the total demand (total charge demand) for electric charging power is reflected in the electric power generation plan, the electric power storage plan, or the electric power purchase plan in consideration of $CO_2$ emissions and costs. Then, the server control device 11 ends the control routine.

As a result, in the electric power management system 1 according to the embodiment, by calculating the total demand (total charge demand) for electric charging power of the electrified vehicles 20 in the management area 100 in advance and calculating the electric power supply and demand operation plan based on the calculated total demand (total charge demand) for electric charging power, it is possible to prevent the electric power supply and demand operation plan from failing when the charge demand of the electrified vehicles 20 is large.

Further, in the electric power management system 1 according to the embodiment, the server control device 11 selects a recommended charging facility 30 from among the charging facilities 30. For example, the server control device 11 selects a recommended charging facility 30 from among the charging facilities 30 based on the expected charging value of each of the electrified vehicles 20, the charging methods of the electrified vehicles 20, and the like. Then, the server control device 11 outputs a signal of information on the recommended charging facility 30 to at least one of an in-vehicle information terminal 26 such as a car navigation system mounted on the electrified vehicle 20 and a mobile information terminal such as a smartphone owned by a driver of the electrified vehicle 20.

Figure 8:
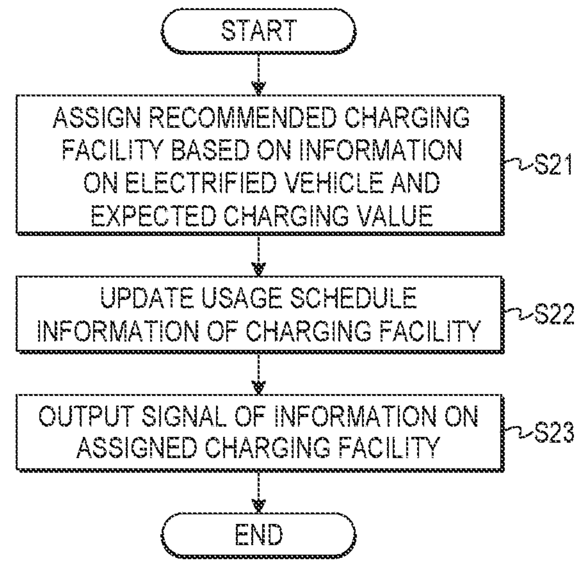
FIG. 8 is a diagram illustrating a recommended charging facility selection control routine executed by the server control device of the management server.

FIG. 8 is a diagram illustrating a recommended charging facility selection control routine executed by the server control device 11 of the management server 10.

First, in step S21, the server control device 11 selects and assigns the charging facility 30 recommended for the electrified vehicle 20 based on the information on the electrified vehicle 20 and the expected charging value of the electrified vehicle 20. Next, in step S22, the server control device 11 updates usage schedule information of the assigned charging facility 30 in the electric power supply and demand operation plan. The usage schedule information is, for example, a usage start time, a usage end estimated time, and the like. Next, in step S23, the server control device 11 outputs a signal of information on the assigned charging facility 30 to at least one of the mobile information terminals owned by the driver of the electrified vehicle 20.

This allows the user of the electrified vehicle 20 to learn the recommended charging facility 30 for charging the in-vehicle battery 25 of the electrified vehicle 20 in advance. As a result, when the electrified vehicle 20 performs charging of the in-vehicle battery 25 at the charging facilities 30 scattered in the management area 100, it is possible to reduce an amount of effort required when searching for an available charging facility 30.

Figure 9:
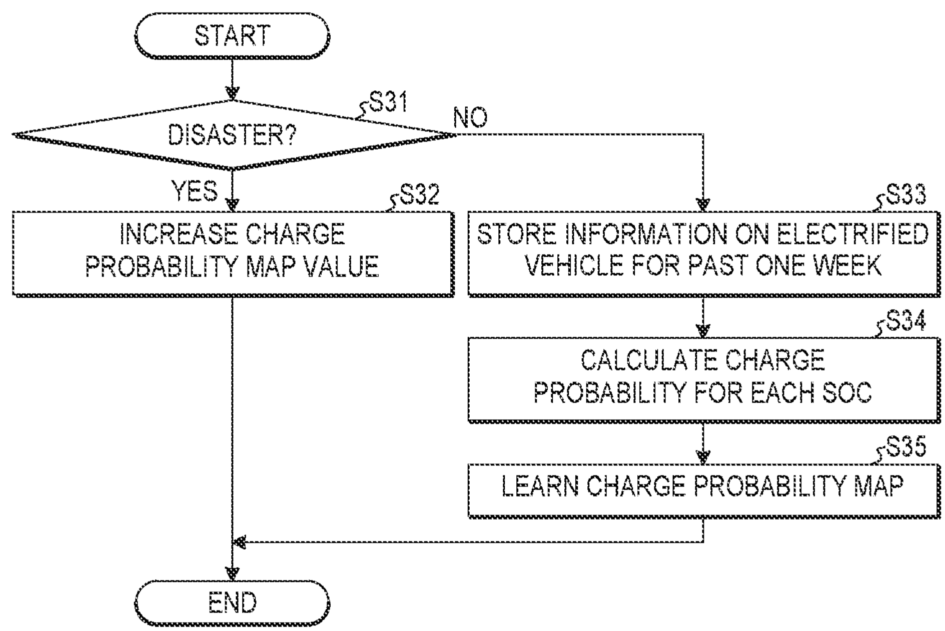
FIG. 9 is a diagram illustrating a charge probability map control routine executed by the server control device of the management server in the event of a disaster.

FIG. 9 is a diagram illustrating a control routine of the charge probability map executed by the server control device 11 of the management server 10 in the event of a disaster.

First, in step S31, the server control device 11 determines whether the inside of the management area 100 is involved in a disaster based on the disaster information from the disaster information management device 40. When the server control device 11 determines that the inside of the management area 100 is involved in a disaster (Yes in step S31), in step S32, the charge probability map value (charge probability for each SOC) stored in the storage device 12 of the management server 10 accumulates (step S32). Then, the server control device 11 ends the control routine. On the other hand, when the server control device 11 determines that the inside of the management area 100 is not involved in a disaster (No in step S31), in step S33, the information on the electrified vehicle 20 for the previous week is acquired from the electrified vehicle 20 and stored in the storage device 12. Next, the server control device 11 calculates the charge probability for each SOC (for example, every 10 [%] for the SOC) in step S34. Next, the server control device 11 learns the charge probability map in step S35. In learning the charge probability map, for example, the server control device 11 updates the charge probability map value by calculating the formula of charge probability map value=charge probability×(1/n)+current charge probability map value×n for each SOC. n in the formula is an averaging value, and for example, n=10 can be set. Then, the server control device 11 ends the control routine after learning the charge probability map.

As a result, in the electric power management system 1 according to the embodiment, in the event of a disaster where the charge demand for the electrified vehicle 20 is expected to be higher than an ordinary condition, it is possible to set the charge probability to be higher than the ordinary condition and calculate the electric power supply and demand operation plan. Therefore, it is possible to prevent the electric power supply and demand operation plan from failing.

Further effects and modification examples can be easily derived by those skilled in the art. The broader aspects of the present disclosure are not limited to the particular details and representative embodiments shown and described above. Thus, various modifications can be made without departing from the spirit or scope of the concept of general disclosure as defined by the attached claims and their equivalents.

What is claimed is:

1. A control device comprising:

a processor configured to calculate a total charge demand based on state-of-charge (SOC) information and a charge request signal of each of a plurality of electrified vehicles and perform an operation for creating, based on the calculated total charge demand, an electric power supply and demand operation plan that manages electric power for charging the electrified vehicles by a charging facility;

wherein the processor is configured to calculate an expected value of electric charging power of each of the electrified vehicles based on the SOC information and the charge request signal and calculate the total charge demand by integrating the calculated expected values for the electrified vehicles; and wherein the processor is configured to set a charge probability, which is used when calculating the expected value and indicates a possibility that the electrified vehicle is to be charged according to SOC, to be higher in an event of a disaster than during an ordinary condition.

2. The control device according to claim 1, wherein the processor is configured to perform an operation for creating the electric power supply and demand operation plan such that the total charge demand is reflected in an electric power generation plan, an electric power storage plan, or an electric power purchase plan.

3. The control device according to claim 1, wherein the processor is configured to select the charging facility recommended for each of the electrified vehicles.

4. The control device according to claim 3, wherein the processor is configured to output a signal of information on the recommended charging facility to at least one of an in-vehicle information terminal mounted on the electrified vehicle and a portable information terminal owned by a driver of the electrified vehicle.

5. The control device according to claim 3, wherein the processor is configured to update usage schedule information for the recommended charging facility.

6. A non-transitory storage medium storing a program which causes a processor to calculate a total charge demand based on SOC information and a charge request signal of each of a plurality of electrified vehicles and perform an operation for creating, based on the calculated total charge demand, an electric power supply and demand operation plan that manages electric power for charging the electrified vehicles by a charging facility;

wherein the program causes the processor to perform control for calculating an expected value of electric charging power of each of the electrified vehicles based on the SOC information and the charge request signal and calculating the total charge demand by integrating the calculated expected values for the electrified vehicles; and wherein the program causes the processor to perform control for setting a charge probability, which is used when calculating the expected value and indicates a possibility that the electrified vehicle is to be charged according to SOC, to be higher in an event of a disaster than during an ordinary condition.

7. The storage medium according to claim 6, wherein the program causes the processor to perform an operation for creating the electric power supply and demand operation plan such that the total charge demand is reflected in an electric power generation plan, an electric power storage plan, or an electric power purchase plan.

8. The storage medium according to claim 6, wherein the program causes the processor to perform control for selecting the charging facility recommended for each of the electrified vehicles.

9. The storage medium according to claim 8, wherein the program causes the processor to perform control for outputting a signal of information on the recommended charging facility to at least one of an in-vehicle information terminal mounted on the electrified vehicle and a portable information terminal owned by a driver of the electrified vehicle.

10. The storage medium according to claim 8, wherein the program causes the processor to perform control for updating usage schedule information for the recommended charging facility.

11. An electric power management system comprising:

an electrified vehicle including a first processor configured to output SOC information and a charge request signal; and a control device including a second processor configured to calculate a total charge demand based on the SOC information and the charge request signal of each of a plurality of electrified vehicles and perform an operation for creating, based on the calculated total charge demand, an electric power supply and demand operation plan that manages electric power for charging the electrified vehicles by a charging facility;

wherein the second processor is configured to calculate an expected value of electric charging power of each of the electrified vehicles based on the SOC information and the charge request signal and calculate the total charge demand by integrating the calculated expected values for the electrified vehicles; and wherein the second processor is configured to set a charge probability, which is used when calculating the expected value and indicates a possibility that the electrified vehicle is to be charged according to SOC, to be higher in an event of a disaster than during an ordinary condition.

12. The electric power management system according to claim 11, wherein the second processor is configured to perform an operation for creating the electric power supply and demand operation plan such that the total charge demand is reflected in an electric power generation plan, an electric power storage plan, or an electric power purchase plan.

13. The electric power management system according to claim 11, wherein the second processor is configured to select the charging facility recommended for each of the electrified vehicles.

14. The electric power management system according to claim 13, wherein the second processor is configured to output a signal of information on the recommended charging facility to at least one of an in-vehicle information terminal mounted on the electrified vehicle and a portable information terminal owned by a driver of the electrified vehicle.

* * * * *